United States Patent [19]
Moylan

[11] 3,731,073

[45] May 1, 1973

[54] PROGRAMMABLE SWITCHING ARRAY

[75] Inventor: Philip John Moylan, Holmdel, N.J.

[73] Assignee: Bell Telephone Laboratories, Incorporated, Murray Hill, Berkeley Heights, N.J.

[22] Filed: Apr. 5, 1972

[21] Appl. No.: 241,267

[52] U.S. Cl. ..................235/152, 235/176, 307/207, 328/92

[51] Int. Cl. ............................................H03k 19/20

[58] Field of Search......................235/152, 175, 176; 307/203, 207; 328/92, 97, 158; 340/172.5

[56] References Cited

UNITED STATES PATENTS

| | | | |
|---|---|---|---|
| 3,313,926 | 4/1967 | Minnick | 235/175 |
| 3,400,379 | 9/1968 | Harman | 340/172.5 |

*Primary Examiner*—Malcolm A. Morrison
*Assistant Examiner*—David H. Malzahn
*Attorney*—R. J. Guenther et al.

[57] ABSTRACT

A method and apparatus are disclosed for programming a fixed array of identical logic modules to generate an arbitrary combinational switching function. In particular, an array is provided which includes an ordered arrangement of columns of modules, each module having a plurality of input leads and at least one output lead. By completing electrical paths between the output leads of selected ones of the modules in a given column with the inputs of modules in the adjacent column, the array is tailored to produce the desired function. The connections are specified by an interconnection algorithm which is based on factors of the desired switching function and which is chosen to eliminate crossovers among the connecting paths.

10 Claims, 7 Drawing Figures

Patented May 1, 1973

3,731,073

4 Sheets-Sheet 1

PROGRAMMABLE SWITCHING ARRAY

FIELD OF THE INVENTION

This invention relates to logic function generating circuits. More particularly, the present invention relates to iterative arrays of substantially identical modules for realizing an arbitrary switching function. Still more particularly the present invention relates to apparatus and methods for interconnecting a plurality of substantially identical switching circuit modules arranged in a two-dimensional array where the interconnecting paths are placed in such a manner as to eliminate crossovers.

BACKGROUND AND PRIOR ART

Switching circuits have long been used in various mechanical and electromechanical forms to perform logical and control operations in such diverse areas as telephone switching systems and desk calculators. The recent widespread use of electronic data processing machines and related apparatus has made the systematic study of electronic switching or logic circuits a highly important area of scientific and engineering effort.

According to one classification, switching circuits are divided into two broad categories, combinational circuits and sequential circuits. Combinational circuits are those in which the output signals depend only upon the combination of input signals and not upon the past history or sequence of the input signals. Sequential circuits are those in which the output signals do depend upon the sequence of input signals. A sequential circuit, also referred to as a finite state machine, may be considered to be a combinational circuit with memory to record the circuit's past history. A more complete discussion of many of the aspects of combinational and sequential switching circuits can be found in any one of several well-known papers and books on switching circuits, such as, for example, D. C. Aufenkamp, and F. E. Hohn, "Analysis of Sequential Machines," *IRE Transactions on Electronic Computers*, *EC*–6, pp. 276–285, Dec., 1957; D. A. Huffman, "The Synthesis of Sequential Switching Circuits," J. Franklin Institute, 257:161–190, Mar., 1954; M. Phister, Jr., "Logical Design of Digital Computers," John Wiley & Sons, Inc., New York, 1958; M. P. Marcus, "Switching Circuits for Engineers," Prentice-hall, Inc., New Jersey, 1967; R. E. Miller, "Switching Theory," Vol. I, *Combinational Circuits* (Vol. II *Sequential Circuits*), John Wiley & Sons, Inc., New York, 1965; W. S. Humphrey, "Switching Circuits," McGraw-Hill, New York, 1958; and S. H. Caldwell, "Switching Circuits and Logic Design," Wiley, New York, 1958.

Recently developed manufacturing techniques make possible the economical simultaneous production of a large number of integrated circuit semiconductor devices. These so-called batch-fabrication techniques make possible the simultaneous manufacture of the many devices necessary to realize many complicated switching circuit arrangements. Further, these techniques allow the interconnection of the devices to be made at the time of manufacture; that is, no extensive hand or machine interconnection of the separate logic devices is required. It is most desirable in many cases that the individual device or small combination of devices be identical, thereby simplifying the manufacturing process. When this is possible, and the combinations of devices (cells or modules) are arranged in regular arrays, the results are often referred to as microcellular arrays.

A review of microcellular techniques may be found in "A Survey of Microcellular Research," R. C. Minnick in *Journal of the Association for Computing Machinery*, Vol. 14, No. 2, Apr., 1967, pp. 203–241. Based on this study, it is clear, as the author explicitly states, that there is a long-felt need for development in the area of multiple-function programmable arrays suitable for integrated circuit batch-fabrication techniques.

Other aspects of logical arrays are described in F. C. Hennie, *Iterative Arrays of Logical Circuits*, MIT Press, 1961. An important improvement in the switching array art appears in U. S. Pat. No. 3,619,583 issued Nov. 9, 1971, to T. F. Arnold and assigned to the assignee of the instant application. Other developments appear in U. S. Pat. No. 3,473,160 issued Oct. 14, 1969, to S. E. Wahlstrom.

An important limitation in many prior art logic array configurations has been the need for complicated interconnections between the individual modules in logic arrays. U. S. Pat. No. 3,579,119 issued May 18, 1971, to S. S. Yau and C. K. Tang presents one attempt to simplify interconnections in a logic array. This interconnection problem is, of course, not peculiar to iterative logic arrays. Apparatus and methods for minimizing the complexity of interconnection on integrated circuit substrates in general re described, for example, in U. S. Pat. No. 3,621,208 issued Nov. 16, 1971, to D. D. Isett, J. A. Haliver and H. W. Von Beek. such techniques as are described in these patents are, however, not universally applicable to logic circuit array structures.

it is therefore an object of the present invention to provide improved methods and apparatus for realizing logic circuit arrays capable of generating an arbitrary function of a set of input variables.

It is another object of the present invention to provide simplified apparatus for realizing a logic array on an integrated circuit substrate including a plurality of logic circuits and means for selectively interconnecting these circuits.

It is still another object of the present invention to interconnect on an integrated circuit substrate a plurality of substantially identical logic circuit elements in such manner as to eliminate crossovers while realizing a logic array capable of generating an arbitrary combinational function of a plurality of input variables.

SUMMARY OF THE INVENTION

The above and other objects are realized in an illustrative embodiment of the present invention wherein basic logic modules are arranged in a columnar arrangement to form "stages." The individual stages are then interconnected to form an ordered, e.g., left-to-right, sequence of stages. This arrangement of stages, each containing a column of modules is seen to constitute a two-dimensional array. In the case of a combinational logic circuit, each input variable $X_i$, $i = 0,1,2,...,N_2$ is conveniently assigned to a respective stage in the array. By factoring the required output function into a function of $X_i$ and its complement, $X_i'$ for each $i$, the factors (as a function of the variables $X_{i-1}, X_{i-2},..., X_0$) required as input functions at the ith stage are uniquely identified. By grouping modules at the ith stage which require these input functions and by providing a fanout capability at the $k+h$ module in the $(i-1)$th stage sufficient to drive the $(k-1)$th, $k+h$, and $(k+1)$th modules in the $i$th stage, the need for crossovers in interconnection paths is eliminated. When the number of modules at the ith stage which require a given input function exceeds 3 (or in some cases a higher number) the module at the $(i-1)$th stage which generates the given input function is replicated and positioned in the $(i-1)$th stage adjacent a group (or groups) in the $i$th stage requiring that input function.

The required interconnection pattern for any given function of a set of input variables is determined by a well-defined analysis readily performed in a programmed digital computer or by hand. The actual interconnection paths are conveniently generated, for example, in an integrated electronic context by well-known photolithographic techniques in response to information derived from this analysis.

DETAILED DESCRIPTION

The detailed description of the present invention will be treated largely by way of example. However, to set an appropriate reference frame, an initial discussion of the more general aspects of the invention will be presented first.

Figure 1:
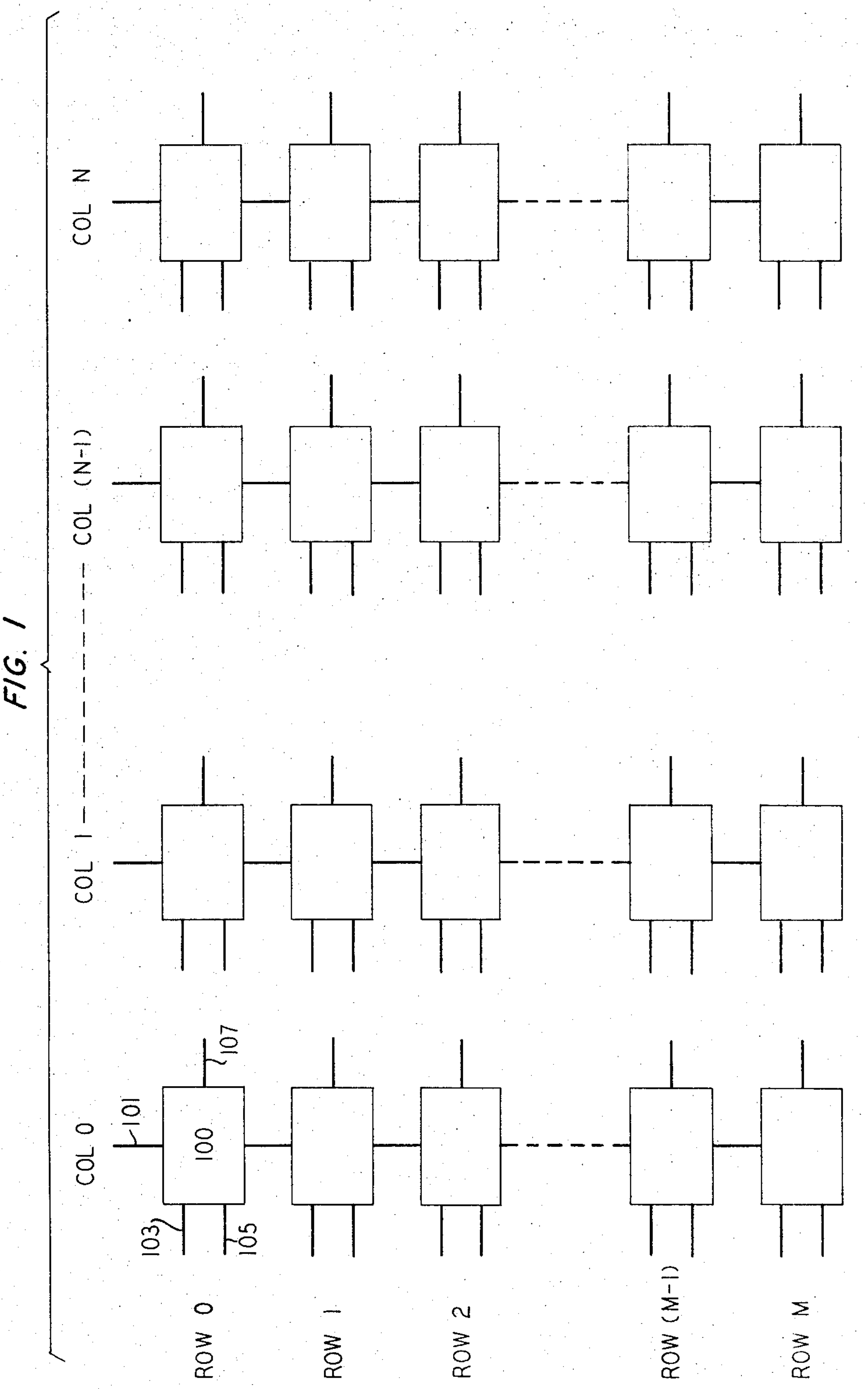
FIG. 1 illustrates the overall arrangement of an array of logic modules in accordance with the instant invention.

FIG. 1 is a representation of the basic array configuration for realizing an arbitrary switching function in accordance with the present invention. It is seen that a plurality of substantially identical circuit modules is arranged in a two-dimensional rectangular array. As illustrated in FIG. 1, there are a total of $N + 1$ columns in the array and a total of $M + 1$ rows in the array, where M and N are positive integers. Each of the logic modules in the array of FIG. 1 is arranged to have, in a typical embodiment, three input terminals, two at the left-hand edge of the module, and one at the top of the module, and one output terminal at the right of the logic module. For example, module 100 at the upper left-hand corner of the array of FIG. 1 includes input terminals 101, 103 and 105 and output terminal 107. The lead emanating from the lower portion of the blocks representing the logic modules is a continuation of the lead appearing at the top of the logic module. That is, provision is made to feed through the input leads appearing at the top of the modules in row 1 of each column to each of the succeeding (lower) logic modules in respective columns.

The configuration depicted in FIG. 1 is, of course, incomplete in that no interconnection is provided between the modules in the respective columns. Indeed, it is one object of the present invention to provide a simple and convenient method for interconnecting the modules. It can be seen that what appears to be the most straightforward interconnection pattern may not yield the desirable pattern having no crossovers among the interconnecting leads. Thus, for example, if it were desired to connect the module appearing at row 2, column 0 in FIG. 1 to one of the inputs of the module appearing at row 0, column 1, a distinct possibility of a crossover might exist if the output from the module at row 1, column 0 were required to be connected to one of the inputs of the module appearing at row 1, column 1. In the detailed description to follow it will become apparent, in accordance with the present invention, how such a crossover can be avoided.

In a typical combinational circuit embodiment of the present invention each of the inputs at the top of the respective columns will be associated with an input variable. The desired outputs will appear on the output leads of the modules in column N. The inputs appearing at the left of FIG. 1, i.e., the inputs to the modules in column 0, are typically arranged to have impressed on them constant valued functions. As will appear in the description below, not all leads nor all modules are necessarily used in realizing a given output function of a set of input variables.

Figure 2:
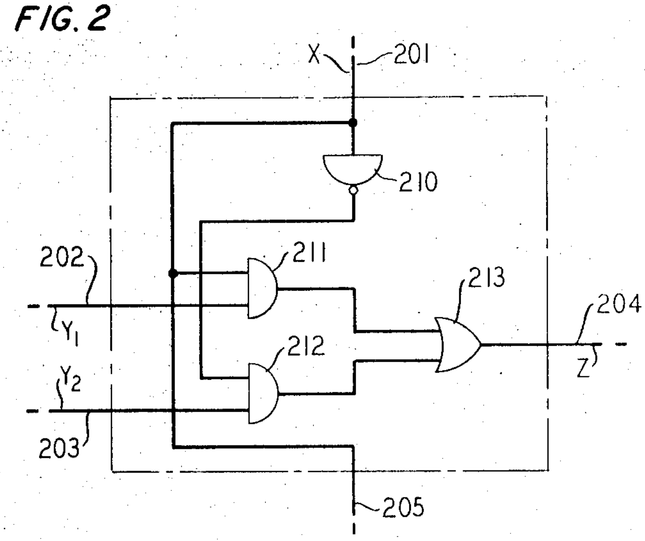
FIG. 2 shows a typical logic module which may be used in the array of FIG. 1 in accordance with the instant invention.

FIG. 2 is a schematic diagram representation of a typical module which may be used in the array configuration shown in FIG. 1. As was indicated above, there are three input leads to the modules. These are represented in FIG. 2 by the designations 201, 202, and 203. The output leads for the module shown in FIG. 2 are designated 204 and 205. It should be recognized, of course, that lead 205 is in actuality a continuation of input lead 201. Thus, in effect the lead 201 is an input connection to a bus. Also shown in FIG. 2 are AND gates 211 and 212. Circuit element 213 is an OR circuit. Circuit element 210 shown in the form of a NAND gate is seen to have but a single input. It therefore functions as an inverter circuit. Each of these elements is of standard design and each is typically implemented in the form of an integrated circuit chip or some portion thereof. The interconnecting leads appearing within the dotted block in FIG. 2 are also typically generated in accordance with standard semiconductor integrated circuit technology.

If an input variable X is associated with the input lead 201 and input variables $y_1$ and $y_2$ are associated with the input leads 202 and 203, respectively, then the output function appearing on lead 204 and designated Z is seen to be representable by the logical equation $$Z = y_1X + y_2X'$$

The manner in which the circuit in FIG. 2 realizes the above function should be readily apparent. However, for the sake of completeness, the operation of this circuit will be traced. The quantity $X$ appearing on lead 201 is applied to AND gate 211 where it is ANDed with the $y_1$ signal appearing on lead 202. The NAND gate 210 is seen to generate from the $X$ input the complement signal $X'$. $X'$ is then applied to AND gate 212 where it is ANDed with the $y_2$ signal appearing on lead 203. The outputs from the two AND gates 211 and 212 are then ORed in OR circuit 213, the output of which provides the output signal $Z$ on lead 204.

The number of rows and columns to be used in implementing an actual circuit will vary when using the general configuration shown in FIG. 1 in accordance with the present invention. For combinational circuits using modules of the type shown, the number of input variables will usually dictate the number of columns (stages), and the number of output variables will provide a minimum for the number of rows.

An example will now be given to illustrate one important class of embodiments of the present invention and the manner of constructing them. Specifically a combinational circuit will be derived which generates as outputs a number of binary signals having a specified functional relation to values assumed by a plurality of binary input signals.

One convenient manner of specifying a logic function is to provide a table including a list of inputs and an associated list of desired outputs. For example, the lists appearing below in Table I relate the values for three output variables $Z_0$, $Z_1$, and $Z_2$ as a function of the values of four input variables $X_0$, $X_1$, $X_2$, and $X_3$.

TABLE I

| Inputs | | | | Outputs | | |
|---|---|---|---|---|---|---|
| $X_3$ | $X_2$ | $X_1$ | $X_0$ | $Z_2$ | $Z_1$ | $Z_0$ |
| 0 | 0 | 0 | 0 | 0 | 0 | 1 |
| 0 | 0 | 0 | 1 | 1 | 0 | 1 |
| 0 | 0 | 1 | 0 | 1 | 0 | 1 |
| 0 | 0 | 1 | 1 | 0 | 1 | 1 |
| 0 | 1 | 0 | 0 | 1 | 0 | 1 |
| 0 | 1 | 0 | 1 | 0 | 1 | 1 |
| 0 | 1 | 1 | 0 | 0 | 1 | 1 |
| 0 | 1 | 1 | 1 | 1 | 0 | 1 |
| 1 | 0 | 0 | 0 | 0 | 0 | 0 |
| 1 | 0 | 0 | 1 | 0 | 1 | 0 |
| 1 | 0 | | 0 | 0 | 1 | 0 |
| 1 | 0 | 1 | 1 | 0 | 0 | 1 |
| 1 | 1 | 0 | 0 | 0 | 1 | 0 |
| 1 | 1 | 0 | 1 | 0 | 0 | 1 |
| 1 | 1 | 1 | 0 | 0 | 0 | 1 |
| 1 | 1 | 1 | 1 | 0 | 1 | 0 |

Figure 3:
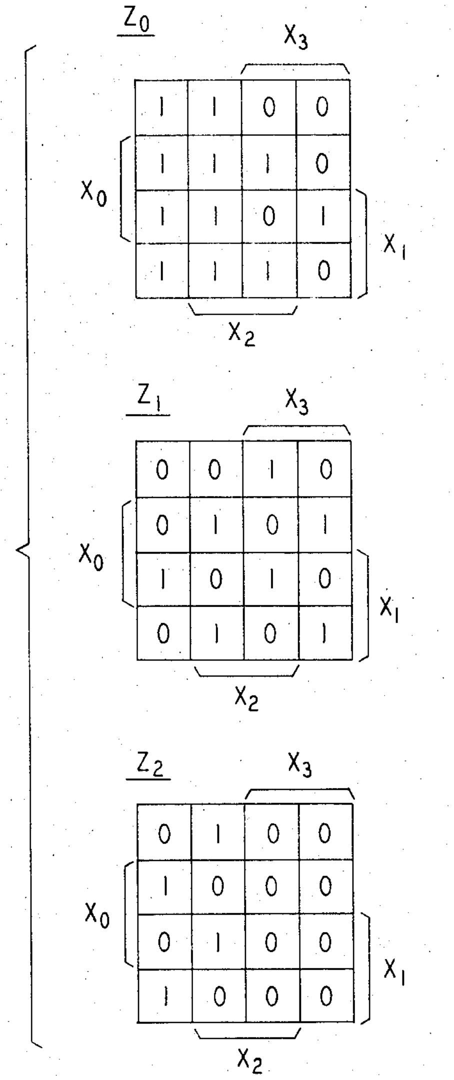
FIG. 3 shows truth tables for an illustrative combinational switching function.

It is known to be elementary in the switching circuit arts to derive equations relating input and output variables for a combinatorial logic function. Thus, using Table I and the associated "truth tables" appearing as FIG. 3 one can, using techniques known in the art, readily derive the following equations $$Z_0 = X_3' + X_3X_2'X_1X_0 + X_3X_2X_1'X_0 + X_3X_2X_1X_0'$$

$$Z_1 = X_3'X_2'X_1X_0 + X_3'X_2X_1'X_0 + X_3'X_2X_1X_0' + X_3X_2'X_1'XA_0$$

$$+ X_3X_2'X_1X_0 + X_3X_2X_1'X_0' + X_3X_2X_1X_0$$

$$Z_2 = X_3'X_2'X_1'X_0 + X_3'X_2X_1X_0' + X_3'X_2X_1'X_0' + X_3'X_2X_1X_0 \qquad 1$$

It next proves convenient to factor Eqs. (1), for each of the output variables $Z_j$, $j = 0,1,2$, into two expressions in each of which one of the input variables or its complement appears as a single multiplicative factor. In particular, it proves convenient to factor $Z_j$ into an explicit function of the last (highest index) variable. Since the variable indices may be assigned arbitrarily, however, this factorization imposes no special limitation. In any event, the factorization is performed in accordance with the following format $$Z_j = Y_{ij} = f_{ij0}X_i' + f_{ij1}X_i, \quad j=0,1,2. \qquad 2$$

Note that $Y_{ij}$ (a variable with two indices) is substituted in Eq. (2) for $Z_j$. This is done for purpose of generality, i.e., $Y_{ij}$ may be treated as the $j$th output from the $i$th column in an array of the form shown in FIG. 1.

For Eqs. (1) the factorization in accordance with Eq. 2 is, $$Z_j = Y_{3j} = f_{3j0}X_3' + f_{ej1}X_3, \quad j=0,1,2 \qquad 3$$

or more particularly, $$f_{300} = 1$$
$$f_{301} = X_2'X_1X_0 + X_2X_1'X_0 + X_2X_1X_0'$$
$$f_{310\,i} = x_2'X_1X_0 + X_2X_1'X_0 + X_2X_1X_0'$$
$$f_{311} = X_2'X_1'X_0 + X_2'X_1X_0' + X_2X_1'X_0' + X_2X_1X_0$$
$$f_{320} = X_2'X_1'X_0 + X_2'X_1X_0' + X_2X_1'X_0' + X_2X_1X_0$$
$$f_{321} = 0 \qquad 4$$

At this point it proves convenient to segregate the constant valued expressions appearing as factors, as above. Thus in the immediately preceding example, $f_{300}$ and $f_{321}$ are both constant valued expressions, and, as such, are segregated for disposition in a manner to be described below. The remaining expressions $f_{ij0}$ or $f_{ij1}$ which are not constant valued expressions are then entered into a list in an order dictated by the $jk$ index. These items are conveniently referred to as $F_{ik}$. For the present example these functions assume the following form.

$$F_{30} = f_{301} + X_2'X_1X_0 + X_2X_1'X_0 + X_2X_1X_0'$$
$$F_{31} = f_{310} = X_2'X_1X_0 + X_2X_1'X_0 + X_2X_1X_0'$$
$$F_{32} = f_{311} = X_2'X_1'X_0 + X_2'X_1X_0' + X_2X_1'X_0' + X_2X_1X_0$$
$$F_{33} = f_{320} = X_2'X_1'X_0 + X_2'X_1X_0' + X_2X_1'X_0' + X_2X_1X_0 \qquad 5$$

Since $f_{301} = f_{310}$ and $f_{311} = f_{320}$, $F_{31}$ and $F_{33}$ are redundant and adjacent and may be eliminated. That is, they correspond to the same input function to adjacent modules in the ith stage. Accordingly, the list of factors corresponding to inputs to the final stage in an array other than constant valued expressions is reduced after renumbering them for convenience to $$F_{30} = f_{301} = X_2'X_1X_0 + X_2X_1'X_0 + X_2X_1X_0'$$
$$F_{31} = f_{311} = X_2'X_1'X_0 + X_2'X_1X_0' + X_2X_1'X_0' + X_2X_1X_0 \qquad 6$$

Figure 4:
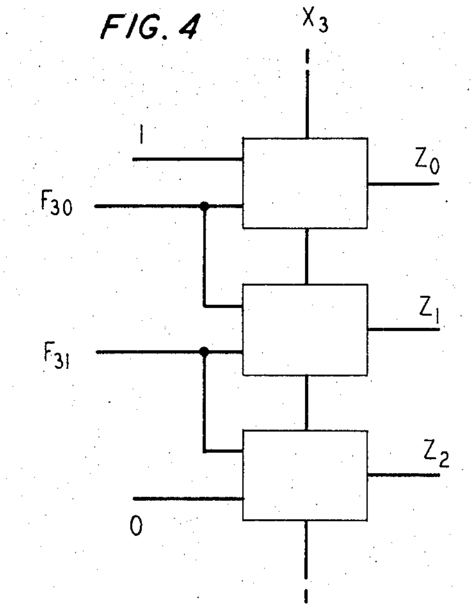
FIG. 4 illustrates an output stage in an array of the type shown in FIG. 1 for a typical combinational circuit.

From the above analysis it is clear that a circuit of the type shown in FIG. 4 will generate the required outputs dictated in Table I. That circuit, however, is incomplete in the sense that $F_{30}$ and $F_{31}$ are not shown explicitly generated as a circuit function by input variables. What should be observed from the circuit of FIG. 4, however, is that the column inputs are conveniently grouped to avoid the necessity of crossovers in interconnecting paths. The manner for realizing the input circuit functions $F_{30}$ and $F_{31}$ will now be shown.

The above procedure for deriving the required outputs, those functions which are required as inputs, is repeated in deriving the input functions for the circuit shown in FIG. 4. Recall that in the cascaded stage (column) in FIG. 1, the inputs for a given stage are the outputs from the preceding stage. Thus, in particular, it is necessary to generate the functions $Y_{20}$ and $Y_{21}$ where $$Y_{20}=F_{30}=X_2'X_1X_0+X_2X_1'X_0+X_2X_1X_0'$$
$$Y_{21}=F_{31}=X_2'X_1'X_0+X_2'X_1X_0'+X_2X_1'X_0'+X_2X_1X_0 \quad (7)$$

or, using the notation $$Y_{2j}=f_{2j0}X_2'+f_{2j1}X_2 \quad (8)$$

to represent the functions $Y_{2j}$ in the form of factored expressions of $X_2$ and $X_2'$, an analysis similar to that used in connection with the final stage above yields for the next-to-last stage (based on the $Y_{2j}$ functions) the following results $$f_{200}=X_1X_0=F_{20}$$
$$f_{201}=X_1'X_0+X_1X_0'=F_{21}$$
$$f_{210}=X_1'X_0+X_1X_0'=F_{21}$$
$$f_{211}=X_1'X_0'+X_1X_0=F_{22}. \quad (9)$$

Note that $f_{201}$ and $f_{210}$ have been recognized to be identical.

Continuing this analysis for the second-from-the-last stage we obtain $$Y_{10}=F_{20}=X_1X_0$$
$$Y_{11}=F_{21}=X_1'X_0+X_1X_0'$$
$$Y_{12}=F_{22}+X_1'X_0'+X_1X_0 \quad (10)$$

and, factoring the $Y_{1j}$ in the form $$Y_{1j}=f_{1j0}X_1'+f_{1j1}X_i \quad (11)$$

we obtain $$f_{100}=0$$
$$f_{101}=X_0=F_{10}$$
$$f_{111}=X_0'=F_{11}$$
$$f_{120}=X_0'=F_{11}$$
$$f_{121}=X_0=F_{12}. \quad (12)$$

Finally, for the next stage $$Y_{00}=F_{10}=X_0$$
$$Y_{01}=F_{11}=X_0'$$
$$Y_{02}=F_{12}=X_0 \quad (13)$$

and, using the now usual form of factorization, viz., $$Y_{0j}=f_{0j0}X_0'+f_{0j1}X_0, \quad (14)$$

we get $$f_{00}=0$$
$$f_{001}=1$$
$$f_{010}=1$$
$$f_{011}=0$$
$$f_{020}=0$$
$$f_{021}=1 \quad (15)$$

Figure 5:
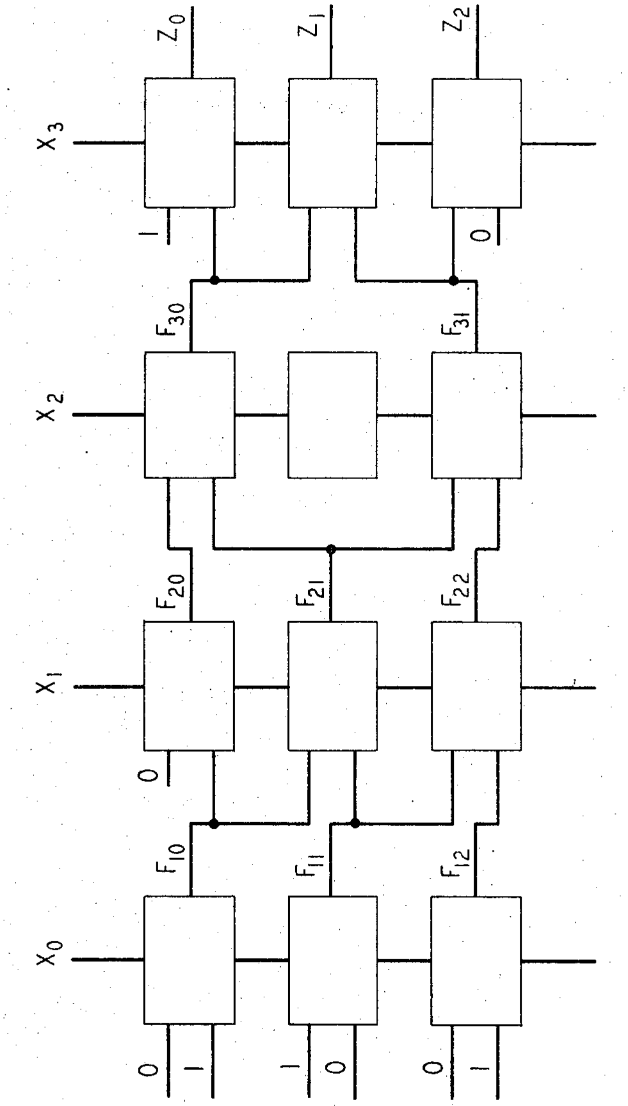
FIG. 5 shows a logic array for a typical combinational circuit corresponding to the truth tables of FIG. 3 with all interconnections completed and including the circuit of FIG. 4 as the output stage.

The process of factoring and listing as above terminates at this point because only constant inputs are required to be applied. The completed circuit for generating the inputs to the respective stages which were derived above is shown in FIG. 5.

Statement of the Algorithm

With the above general description and a typical working example as background, there will now be presented a formal statement of the algorithm for specifying the interconnection between substantially identical modules in a rectangular array. The steps of the algorithm are:

1. Identifying a stage comprising one or more modules arranged in a column with each of the input variables. For this purpose it is convenient to identify an index $i$ with each of the input variables. Thus $X_i$ is a typical input variable. The stage associated with the highest order index value for $i$ is the output stage for the array.

2. Representing the output of each stage as a factored function of the input variable (and its complement) associated with that stage. Thus, form the equation $$Y_{ij}=f_{ij0}X_i'+f_{ij1}X_i. \quad (16)$$

It should be noted that $f_{ij0}$ is the factor associated with the complement of the variable $X_i$ and the factor $f_{ij1}$ is the factor associated with the uncomplemented input variable, $X_i$ associated with the $i$th stage. Since there are a number of outputs $Y_{ij}$ determined by the range of the subscript $j$, there will be a maximum of twice as many factors as there are outputs from the $i$th stage.

3. Identifying any of the $f_{ijk}$ which have a constant value of 0 or 1. When either of these conditions is found to exist, the corresponding input to the module which has $Y_{ij}$ as its output is connected to the appropriate constant signal value of 0 or 1. This may conveniently be effected by connecting this input to ground or to a local voltage reference point associated with the semiconductor elements forming the module.

4. Arranging the remaining $f_{ijk}$ in a list which is ordered in accordance with the $jk$ component of the subscript index.

5. Comparing adjacent items in the list formed at step 4 and grouping all adjacent elements in the list of $f_{jk}$'s which are identical. Associate a function $F_{ik}$ with consecutive ones of the groups formed in the list. It should be noted that even though a factor $f_{ijk}$ should be identical to another factor, they are not associated with the same group and are not assigned a common functional representation $F_{ik}$ unless the $f_{ijk}$ were adjacent in the list formed at step 4.

By reviewing the example treated above in light of the formal statement of the algorithm, it is clear how crossovers are eliminated in accordance with the present invention in the interconnection pattern of an array of the type shown in FIG. 1. In particular, it is noted that the number of inputs to a given stage (column in the array in FIG. 1) is determined by the number of factors which are required to be generated at the preceding stage. The number of outputs for a given stage is dictated by the range of the index $j$ which is derived from an enumeration of equations of the form of Eq. (16) above. It can be seen that the explicit generation of all factors is provided for and the necessary circuitry for forming these factors is provided with the necessary degree of replication in the preceding stage. When it happens that adjacent input factors are identical and only then, they are advantageously combined.

6. Connecting inputs to modules in the *i*th stage to the respective outputs of modules in the $(i-1)$th stage. By ordering the variables and factors as above, it is assured that the input functions $F_{ijk}$ to the ith stage are generated in the $(i-1)$th stage in the correct order. Input functions having constant values are connected to an appropriate ground or other constant voltage terminal.

Figure 6:
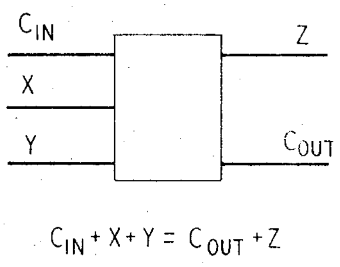
FIG. 6 is a functional schematic representation of an adder circuit.

It may be useful to consider an additional example in light of the remarks given above. Accordingly, there is shown in FIG. 6 a representation of a logic circuit for performing the ADD function. Thus there are provided at the left-hand side of FIG. 6, three input leads labeled $C_{IN}$, X, and Y. Correspondingly, there are two outputs Z and $C_{out}$. The desired logical relation between these outputs and inputs is the well-known ADD function, to wit $$C_{IN}+X+Y=C_{OUT}+Z \qquad 17$$

All of the variables in this Eq. (17) are understood to be binary integers. $X$ and Y, of course, represent digits in the augend and addend, while Z represents a digit position in the sum. Similarly, $C_{IN}$ and $C_{OUT}$ represent the input and output carrys, respectively. Table II is an explicit representation of the input/output function for the circuit of FIG. 6.

TABLE II

| INPUT | | | OUTPUT | |
|---|---|---|---|---|
| $C_{IN}$ | X | Y | $C_{OUT}$ | Z |
| 0 | 0 | 0 | 0 | 0 |
| 0 | 0 | 1 | 0 | 1 |
| 0 | 1 | 0 | 0 | 1 |
| 0 | | | | |
| 1 | | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 1 |

Figure 7:
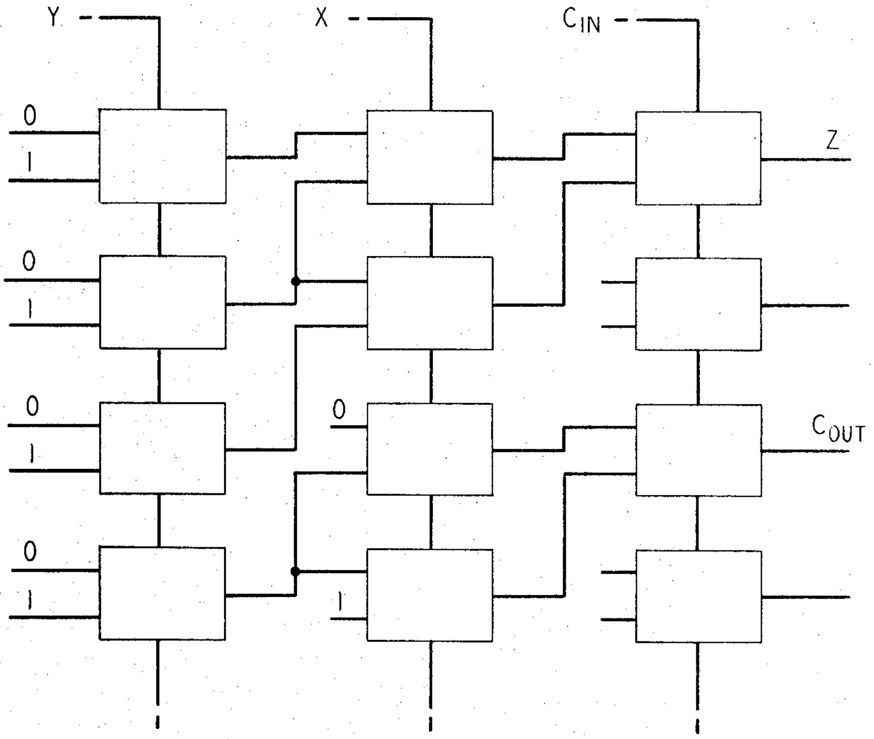
FIG. 7 is an array realization of the adder of FIG. 6 in accordance with one embodiment of the present invention.

FIG. 7 is an array of logic modules of the type shown in FIG. 2, which array assumes the general configuration shown in FIG. 1. The interconnection of the individual modules has been made in accordance with the above interconnection algorithm. It can be readily verified that the circuit of FIG. 7 performs the desired functions dictated by Table II.

The above-described procedures should be understood to be merely typical. Thus, although the examples treated included particular numbers of inputs and outputs, the same procedures are obviously applicable to combinational logic circuits having an arbitrary number of inputs and outputs. It should also be understood that because the factoring and identification procedures used in determining the interconnection between modules in adjacent stages is very well defined that it will lend itself in appropriate cases to automation under program control in a digital computer. Thus, the procedure given above and the arrays resulting from these procedures in no way depend upon human intervention in the sense of providing subjective judgments.

Further, it should be understood that the modules shown in FIG. 2, are merely typical. Other factorizations of the logic equations representing the desired logic functions will suggest other modules to be used. Similarly, other circuit elements for realizing the same logic function as that provided by the module shown in FIG. 2 will occur to those skilled in the art. Extensions of the above-described techniques to other than binary logic functions are also immediate.

What is claimed is:

1. Apparatus for generating signals representing desired combinational logical functions $Z_j$, $j = 0, 1, 2,...,(N_1-1)$ of one or more input logic variables $X_1, = 0,1,...,(N_2-1$ a plurality of substantially identical logic modules arranged in an array having a plurality of ordered rows and a plurality of ordered columns, means for applying signals representing one or more of said input logic variables to selected modules in the first row of said array, connecting means interconnecting selected ones of said modules appearing in a given column, other than the last, to modules appearing in the immediately succeeding column, said connecting means extending from a given module in said given column only to selected ones of the set of modules in said succeeding column which set includes the module in the same row as said given module and those in consecutive adjacent rows, and output means connected to selected ones of the modules in the last column of said array.

2. Apparatus according to claim 1 wherein each of said logic modules comprises a plurality of input terminals, at least one output terminal, and circuit means for generating at said output terminal, signals representing a fixed combinational function of logic variables represented by signals applied at said input terminals.

3. Apparatus according to claim 2 wherein said means for applying comprises means for applying signals representing a given one of said input logic variables to an input terminal of a module in a respective column, said apparatus further comprising means for extending the application of said signals representing said given one of said variables to an input terminal of each module in said respective column.

4. Apparatus according to claim 3 wherein said circuit means in each of said logic modules comprises means for generating the fixed function, $$f_{ij0}X_i' + f_{ij1}X_i,$$

where $X_i'$ is the complement of $X_i$, and $f_{ij0}$ and $f_{ij1}$ are logical functions of one or more of the input variables other than $X_i$.

5. Apparatus according to claim 4 wherein said array comprises $N_2$ columns, and said means for applying comprises means for applying signals representing the ith input variable to an input terminal of the module in the first row of the *i*th column of said array.

6. Apparatus according to claim 5 wherein said circuit means further comprises means for generating a signal representing the complement of a signal representing an applied input variable.

7. Apparatus according to claim 6 wherein said output means comprises $N_1$ ordered output leads each connected to an output terminal of a respective one of said selected modules in the last column of said array, each of said output leads corresponding to one of said desired logical functions.

8. Apparatus according to claim 7 wherein said array comprises at least $N_1$ rows, each of said modules comprises a single output terminal, and wherein signals representing the $j$th one of said desired logical functions appear on the lead connected to the output terminal of the $j$th of said selected modules in the last column of said array.

9. Apparatus according to claim 8 wherein said connecting means comprises means for connecting the input terminals of the $j$th of said selected modules in the $(N_2-1)$th column in said array to the output terminals of those of said modules in the $(N_2-2)$th column which generate $f_{(N_2-1)j0}$ and $f_{(N_2-1)j1}$ as outputs, $f_{(N_2-i)j0}$ and $f_{(N_2-1)j1}$ being the factors expressable in terms of $X_0, X_1, \ldots, X_{N-2}$ which satisfy $$Z_j = v_{(N_2-1)j0} X'_{N_2-1} + f_{(N_2-1)j1} X_{N_2-1}$$

10. Apparatus according to claim 9 wherein said connecting means further comprises means for connecting input terminals of the modules in the ith column to the output terminals of those of the modules in the $(i-1)$th column which contribute signals representing factors $f_{(i-1)j0}$ and $f_{(1-1)j1}$ which are expressible in terms of $X_0, X_1, \ldots, X_{i-1}$ and which satisfy $$Y_{ij} = f_{(i-1)j0} X'_i + f_{(i-1)j1} X_i,$$

where $Y_{ij}$ is a function of $X_0, X_1, \ldots, X_{i-1}$ contributing to the desired function $Z_j$.

* * * * *